Dec. 5, 1933.   P. E. MACK   1,937,971
AUTOMATIC CLUTCH
Filed May 12, 1932
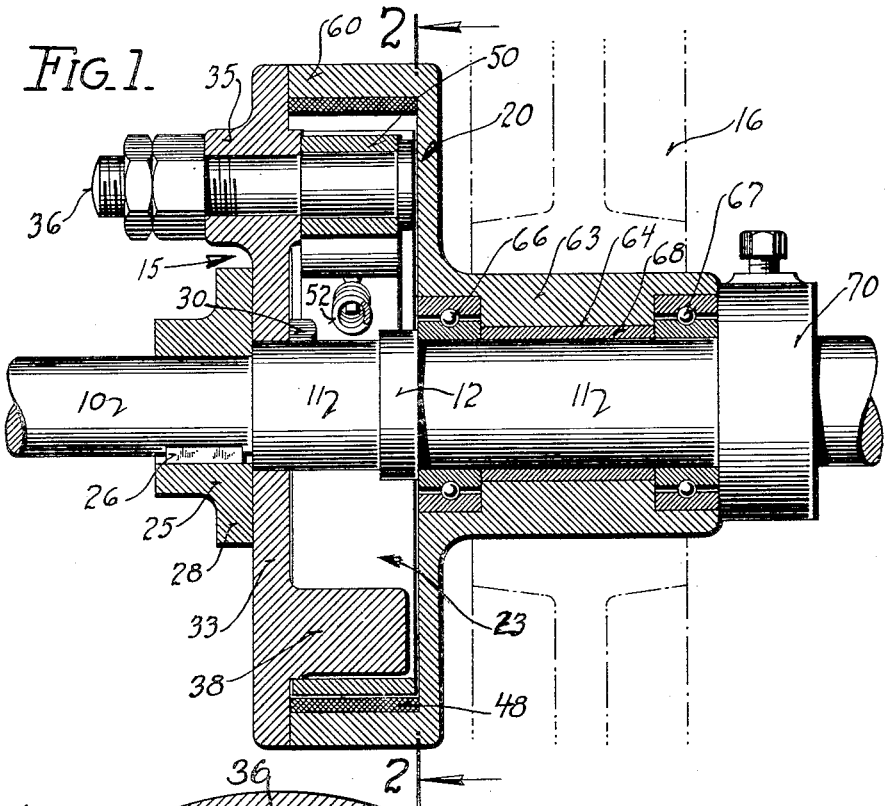
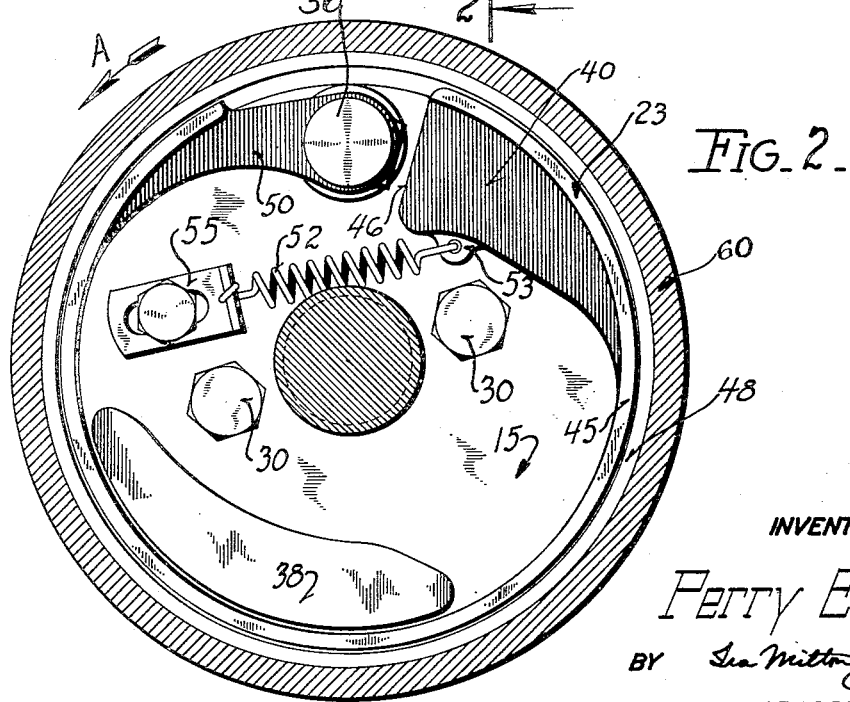
INVENTOR
Perry E. Mack
BY Ira Milton Jones
ATTORNEY Patented Dec. 5, 1933

1,937,971

UNITED STATES PATENT OFFICE 1,937,971

AUTOMATIC CLUTCH

Perry E. Mack, Milwaukee, Wis., assignor to Briggs & Stratton Corporation, Milwaukee, Wis., a corporation of Delaware Application May 12, 1932. Serial No. 610,796

2 Claims. (Cl. 192—105)

This invention relates to automatic clutches and more particularly to a clutch adapted to take effect upon the attainment of a predetermined speed of the shaft.

It is an object of the present invention to provide a clutch based upon the servo-brake principle which is automatically responsive to the speed of the shafting in one direction.

It is a further object of the present invention to provide an automatic clutch having gripping action substantially throughout the entire circumference of the driven member.

These and other objects, the nature of which will become apparent upon consideration of the following description are accomplished by means of a preferred form shown in the accompanying drawing and described in the following specification, the invention residing in the particular combination set forth in the appended claims.

In the drawing:

Figure 1 is a cross sectional elevational view of a preferred form of the clutch embodying the present invention; and Figure 2 is a cross section on the line 2—2 looking in the direction of the arrows.

Referring to the accompanying drawing in which like numerals indicate like parts throughout the several views, a main power shaft 10 is shown as having an enlarged portion 11 thereon which may be provided with a collar 12. A driving member, generally designated 15, is adapted to drive a pulley or other power take-off 16 through a driven member, generally referred to as 20, through the medium of an eccentrically mounted clutch shoe, generally designated 23, the details of the driving member 15, the driven member 20 and the clutch shoe 23, being more fully described below.

The shaft 10 may have a collar 25 keyed thereto through a key 26 or other suitable mechanism adapted to fix the collar 25 on the shaft and hold it against movement thereon. The driving member 15 is attached to a flange 28 on the collar 25 through a plurality of bolts 30 or other suitable fastening means.

The driving member 15 is preferably made of a flat plate 33, roughly circular in plan, and having a boss 35 drilled to receive a mounting stud 36 for mounting the clutch shoe 23. A counterweight 38 is formed on the opposite side of the plate 33 from the base 35 and balances an eccentric weight 40 on the clutch shoe 23.

The clutch shoe 23 is formed of a resilient ring 45 split as shown at 46 and of a size to loosely fit within the driven member 20 with a clutch lining 48 interposed therebetween. Any suitable brake lining may be used for the lining 48 so as to give sufficient gripping action to make the clutch effective.

An ear 50 is formed on the ring 45 on one side of the split 46 and is pivotally connected to the stud 36. The weight 40 heretofore referred to, is formed on the opposite side of the split 46 from the ear 50 and may be either formed integrally with the rib or attached thereto so that rotation of the plate 33 carrying the ring 45 in a direction shown by the arrow "A" constantly tends to throw the weight 40 outwardly and contact the leading edge of the ring 45 with the lining 48.

A spring 52, which opposes the urge of centrifugal force to throw the weight 40 outwardly, is connected to the weight through an ear 53, the opposite end of the spring being retained by the plate 33 through a connector 55. The connector 55 may be made adjustable relative to the weight 40 so as to vary the tension in the spring 52 and hence vary the speed at which the clutch will grip.

The weights 38 and 40 are approximately equal and being on opposite sides of the shaft 10 counteract each other and eliminate pounding on the shaft.

It is also observed that the weight 40 is behind the pivot point afforded by the pin 36 relative to the direction of rotation and that the pivot point is on a smaller radius than the outer frictional surface of the clutch shoe. This construction facilitates the operation of the device.

The driven member 20 is formed of a cup-shaped member 60 surrounding the clutch shoe 23 with the rim of the member 60 in close proximity to the driven member 15, the lining 48 being interposed between the inner periphery of the cup-shaped member 60 and the outer periphery of the clutch shoe 23 to form a frictional drive therebetween. The cup-shaped driven member 60 is provided with a cylindrical extension 63 extending concentrically from its flat side, the member 63 being provided with a bore 64 adapted to fit on the enlarged portion 11 of the shaft.

Bearings 66, 67 and 68 of ordinary design may be interposed between the shaft 11 and the cylindrical extension 64 to give a more nearly frictionless surface therebetween. An adjustable collar 70 may be used to hold the driven member 20 against the collar 12 on the shaft 11.

The pulley 16 is preferably mounted on a cylindrical extension 63 and may be held against movement thereon by any suitable means.

Operation

In operation, the shaft 10 is rotated, which in turn rotates the driving member 15 through the collar 25. Rotation of the driving member 15 rotates the clutch shoe 23 which has a constant tendency, due to the weight 40, to move outwardly into contact with the lining 48, the spring 52 restraining outward movement of the weight 40 until the shaft 10 has reached a predetermined speed.

When the shaft 10 reaches the desired speed the centrifugal force of the weight overcomes the inertia of the spring 52, moving the clutch shoe 23 outwardly into contact with the lining 48.

When the clutch shoe 23 contacts with the lining 48, a servo- or self-winding action takes place between the shoe 23 and the lining 48 and winds the shoe 23 into contact with the lining 48 to form a positive drive therebetween, force being transmitted from the lining 48 to the cup-shaped member 60 which in turn rotates the extension 63, carrying the pulley 16.

Upon the speed of the shaft dropping below the desired speed, the spring 52 again takes effect to pull the weight 40 out of engagement with the lining 48 to break the clutching action.

It will thus be seen that there has been provided a relatively simple clutch mechanism involving the principles of a servo-brake and which is governed by centrifugal force and adapted to automatically cut in and out on the speed passing predetermined speeds.

It will also be noted that the action of the clutch is positive in its gripping action and a relatively large area of the driven member is engaged by the clutch shoe 23 to effect the drive. This promotes a high efficiency and reduces wear on the lining 48 as well as giving a more nearly positive clutch member than has heretofore been possible.

It is realized that the invention is susceptible to various modifications coming well within the scope of one skilled in the art, and it is not, therefore, desired to limit the invention to the precise form herein shown and described, but only by the scope of the appended claims.

What is claimed as new and desired to secure by Letters Patent is:

1. In an automatic clutch of the character described, a drive shaft, a driven member loosely journalled on the shaft and including a cup-shaped element having a cylindrical flange, a brake lining on the inner wall of said flange, a disc fixed to the drive shaft, said disc being substantially the same diameter as the cup-shaped member and lying closely to the peripheral edge portion of said flange to form a cover for the cup-shaped member, a split resilient ring disposed within the cup-shaped member, a stud carried by said disc and pivotally mounting one end portion of the split resilient ring, a weight on the free end portion of the split resilient ring adapted, upon rotation of said disc with the shaft, to move the free end portion of the ring outwardly into contact with the brake lining on the flange of the cup-shaped member, whereby the split resilient ring wraps itself onto the brake lining to provide a positive driving connection between said disc and cup-shaped element of the driven member, and a projection formed integrally with the disc and disposed substantially diametrically opposite the ends of the split ring to counterbalance the weight of the free end portion of the ring and its pivotal mounting, said projection being disposed entirely within the space defined by the cup-shaped element.

2. In an automatic centrifugally operable clutch, a drive shaft, a driven member including a cup-shaped element provided with a cylindrical flange, a disc fixed to the shaft and having its outer peripheral edge portion in close proximity to the peripheral edge of the cylindrical flange so that the disc forms a cover for the cup-shaped element to define therewith a closed space, means entirely within said space to provide a driving connection between said disc and cup-shaped element and comprising a split resilient ring, means to pivotally mount one end portion of said ring on the inner face of the disc, a weight on the outer free end portion of the split resilient ring adapted upon rotation of the disc with the shaft, to throw outwardly into contact with the inner wall of the cylindrical flange and initiate a frictional contact which is increased through the servo-principle to establish a positive driving connection, and a tensile spring having one end anchored to the disc and its other end connected with the free end portion of the split ring to oppose the action of the centrifugal force and determine the speed at which frictional contact is established by the disc and cup-shaped element.

PERRY E. MACK.